United States Patent
Onaisi et al.

(10) Patent No.: US 11,125,080 B2
(45) Date of Patent: Sep. 21, 2021

(54) DETERMINATION OF HORIZONTAL CONSTRAINTS IN SUBSOIL

(71) Applicant: TOTAL SA, Courbevoie (FR)

(72) Inventors: Atef Onaisi, Idron (FR); Kun Su, Idron (FR)

(73) Assignee: TOTAL SA, Courbevoie (FR)

( * ) Notice: Subject to any disclaimer, the term of this patent is extended or adjusted under 35 U.S.C. 154(b) by 418 days.

(21) Appl. No.: 15/570,061

(22) PCT Filed: Apr. 27, 2015

(86) PCT No.: PCT/IB2015/000853
§ 371 (c)(1),
(2) Date: Oct. 27, 2017

(87) PCT Pub. No.: WO2016/174489
PCT Pub. Date: Nov. 3, 2016

(65) Prior Publication Data
US 2019/0024506 A1 Jan. 24, 2019

(51) Int. Cl.
*E21B 49/00* (2006.01)
*G01V 11/00* (2006.01)
(Continued)

(52) U.S. Cl.
CPC ............ *E21B 49/006* (2013.01); *E21B 47/06* (2013.01); *G01V 1/50* (2013.01); *G01V 11/00* (2013.01);
(Continued)

(58) Field of Classification Search
CPC ......... E21B 49/006; E21B 47/06; G01V 1/50; G01V 11/00; G01V 2210/6248; G01V 2320/624; G01V 2210/6242
See application file for complete search history.

(56) References Cited

U.S. PATENT DOCUMENTS

| | | | |
|---|---|---|---|
| 2002/0010548 A1* | 1/2002 | Tare ..................... | E21B 21/08 702/9 |
| 2013/0246022 A1* | 9/2013 | Frydman ............... | E21B 43/20 703/2 |

(Continued)

OTHER PUBLICATIONS

Stresses in the Ground, Chapters, Feb. 24, 2009, https://people.eng.unimelb.edu.au/stsy/geomechanics_text/Ch3_Strs_Ground.pdf, pp. all (Year: 2009).*

(Continued)

*Primary Examiner* — Regis J Betsch
(74) *Attorney, Agent, or Firm* — Patterson Thuente Pedersen, P.A.

(57) ABSTRACT

The present invention relates to a method of determining present-day horizontal stresses in geological formations. The method comprises dividing the received well data in a plurality of contiguous sets of data i, a set of data For each set of data i in the plurality of sets of data, determining, at least parameters $P^i$, a pressure in subsoil i, $b^i$, a Biot coefficient i, $v^i$, a Poisson's ratio i, $\sigma_v^i$, a vertical constraints in subsoil i, $E^i$, a Young's modulus i, $\alpha^i$, a thermal expansion coefficient, and $T^i$, and a subsoil temperature i. The method further comprises, i, computing and outputting the horizontal constraints.

3 Claims, 2 Drawing Sheets

(51) Int. Cl.
*E21B 47/06* (2012.01)
*G01V 1/50* (2006.01)

(52) U.S. Cl.
CPC .............. *G01V 2210/624* (2013.01); *G01V 2210/6242* (2013.01); *G01V 2210/6248* (2013.01)

(56) References Cited

U.S. PATENT DOCUMENTS

2015/0090498 A1* 4/2015 Hareland ............ E21B 45/00
175/48
2015/0292323 A1* 10/2015 Shahri ............... E21B 49/006
702/9

OTHER PUBLICATIONS

Federal Highway Administration, Determination of Horizontal Stress in Soils, Aug. 1981, pp. all (Year: 1981).*

Kim et al., Geological CO2 storage: Incorporation of pore-pressure/stress coupling and thermal effects to determine maximum sustainable pressure limit, Energy Procedia 63 ( 2014 ) 3339-3346 (Year: 2014).*

PCT International Search Report for PCT/IB2015/000853, dated Aug. 30, 2017, 4 pages.

English translation of PCT International Search Report for PCT/IB2015/000853, dated Aug. 30, 2017, 4 pages.

Colin M Sayers et al: "The effect of anisotropy on the Young's moduli and Poisson's ratios of shales", Geophysical Prospecting, Mar. 1, 2013 (Mar. 1, 2013), pp. 416-426, XP055249184, Oxford, UK DOI: 10.111/j.1365-2478.2012.01130.x Retrieved from the Internet: URL:https://www.onepetro.org/download/conference-paper/SEG-2010-2606?id=conference-paper/SEG-2010-2606 [retrieved on Feb. 11, 2016].

John Quirein et al: "Predicting the Stiffness Tensor of a Transversely Isotropic Medium When the Vertical Poisson's Ratio is Less Than the Horrizontal Poisson's Ratio", SPWLA 55 th Annual Logging Symposium, May 18, 2014 (May 18, 2014), XP055249185, Retrieved from the Internet: URL:https://www.onepetro.org/download/conference-paper/SPWLA-2014-0000?id=conference-paper/SPWLA-2014-0000 [retrieved on Feb. 11, 2016].

Lisa Song: "SPE 162233 Minimum Horizontal Stress Profile from Logging Data for Montney Formation of North East British Columbia", Oct. 30, 2012 (Oct. 30, 2012), XP055249138, Retrieved from the Internet: URL:https://www.onepetro.org/download/conference-paper/SPE-162233-MS?id=conference-paper/SPE-162233-MS [retrieved on Feb. 10, 2016].

* cited by examiner

DETERMINATION OF HORIZONTAL CONSTRAINTS IN SUBSOIL

RELATED APPLICATIONS

The present application is a National Phase entry of PCT Application No. PCT/IB2015/000853, filed Apr. 27, 2015, said application being hereby incorporated by reference herein in its entirety.

BACKGROUND OF THE INVENTION

The present invention relates to the determination of in situ horizontal stresses in different geological formations using well log data.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Determining the orientation and the magnitude of in situ horizontal stress has many applications in petroleum engineering. Horizontal stress could be anisotropic due to tectonic stress. In this case, we have two components: the maximum horizontal stress ($\sigma_{hmax}$) and the minimum horizontal stress ($\sigma_{hmin}$).

During evaluation of a prospect, the vertical profile of horizontal stress is needed for estimation of the high of hydrocarbon column. In HPHT (high pressure & high temperature) prospect, horizontal stresses' model is used to assess various possible geomechanical hazards link to reservoir depletion: subsidence, cap rock integrity and casing integrity. In design of well architecture, and well integrity control during drilling, profiles of "frac" (hydraulic fracturing) gradient and the minimum mud weight (MMW) needed for different intervals are two critical parameters and are computed from in situ stress model. These two parameters impact greatly the cost of drilling.

To determine the vertical stress, it is possible to compute, for every current point inside a geological formation located a depth $z_0$, the weight of the overburden layers above the current point: $\sigma_v = \int_0^{z_0} \rho(z) \cdot g \, dz$ (with g the gravitational constant, $\rho(z)$ the density distribution of the overburden layers for points at depth z).

While density log data is absent, usually in shallow section, vertical stress can be derived from region overburden gradient or a synthetic density distribution based on empirical porosity distribution started from ground surface (or seabed).

In the prior art, the horizontal stresses $\sigma_h$ may be computed from the vertical stress $\sigma_v$ and coupled with pore pressure.

Therefore, the prior techniques use this following formula to determine the horizontal stress $\sigma_h$ (without integration with respect to z):

$$\sigma_h = bP + \frac{v}{1-v}(\sigma_v - bP) + \frac{E\alpha}{1-v}T$$

where, E is Young's modulus, b is the Biot coefficient, v is the Poisson's ratio, T is the temperature, $\alpha$ is the thermal expansion coefficient. This equation implies that the magnitude of horizontal stress is uniquely proportional to present-day rock's poroelastic parameters: b, E, $\alpha$.

Actually, this formula of stress calculation is erroneous. The reason is following.

Assuming non lateral deformation, the poro-elastic compaction theory may assume that, for a given layer, an incremental its burial depth $\Delta Z$ induces an augmentation of vertical stress $\Delta\sigma_v$ and an increase of pore pressure $\Delta P$, then provokes an increment of horizontal stress $\Delta\sigma_h$, which is written as:

$$\Delta\sigma_h = b\Delta P + \frac{v}{1-v}(\Delta\sigma_v - b\Delta P)$$

Where b is the Biot coefficient, v is the Poisson's ratio, $\Delta P$ is a pressure variation, the term $$\frac{v}{1-v}(\Delta\sigma_v - b\Delta P)$$

is the effective horizontal stress increment induced by the delta vertical effective stress.

With consideration of an increment of temperature with depth, the thermo-poro-elastic compaction incremental equation may be written as:

$$\Delta\sigma_h = b\Delta P + \frac{v}{1-v}(\Delta\sigma_v - b\Delta P) + \frac{E\alpha}{1-v}\Delta T$$

where $\alpha$ is a rock thermal expansion coefficient.

Indeed, due to the fact that the horizontal stress is progressively increasing over the time when the layer is getting deeper, its poro-elastic parameters E, b, v changed when the burial depth increases.

The poroelastic parameters of above formula may be determined from well logs like DTc, Rhob, NPhi, etc.

There is thus a need for a correct method for a determination of the horizontal constraints in subsoil.

SUMMARY OF THE INVENTION

The invention relates to a method of determination of horizontal constraints (or stresses) in subsoil, wherein the method comprises:
  receiving well data of the subsoil;
  dividing the well data in a plurality of contiguous sets of data i, a set of data i being above a set of data i+1 in corresponding subsoil;
  for each set of data i in the plurality of sets of data, determining, based on the set of data i, at least parameters:
    $P^i$, a pressure in subsoil corresponding to the set of data i;
    $b^i$, a Biot coefficient corresponding to the set of data i;
    $v^i$, a Poisson's ratio corresponding to the set of data i;
    $\sigma_v^i$, a vertical constraints in subsoil corresponding to the set of data i;
    $E^i$, a Young's modulus corresponding to the set of data i;
    $\alpha^i$, a rock thermal expansion coefficient corresponding to the set of data i;

$T^i$, a temperature in subsoil corresponding to the set of data i;

for each set of data i in the plurality of sets of data, computing and outputting the horizontal constraints $$\sigma_h^i = \sigma_h^{i-1} + b^i(P^i - P^{i-1}) +$$
$$\frac{v^i}{1-v^i}(\sigma_v^i - \sigma_v^{i-1} - biPi - Pi - 1 + Ei\alpha i1 - vi(Ti - Ti - 1)).$$

Therefore, it is possible to efficiently determine the horizontal stress/constraints in subsoil. The horizontal stress obtained is more consistent both from theoretical point view and from the feedback of several hundreds of wellbores geo-mechanical models provided by this method.

The well data of the subsoil may be known as "well log data".

If tectonic stress is present in the investigated region, there may be the two principal stresses in the horizontal plane: the maximum horizontal stress ($\sigma_{hmax}$) and the minimum horizontal stress ($\sigma_{hmin}$). They can be determined, for instance, with two additional terms:

$$\sigma_{hmax}^i = \sigma_h^i + \frac{E^i}{1-v^{i2}}\varepsilon_{tec1} + \frac{E^i v^i}{1-v^{i2}}\varepsilon_{tec2}$$

$$\sigma_{hmin}^i = \sigma_h^i + \frac{E^i v^i}{1-v^{i2}}\varepsilon_{tec1} + \frac{E^i}{1-v^{i2}}\varepsilon_{tec2}$$

where $\varepsilon_{tec1}$ and $\varepsilon_{tec2}$ are receptively the tectonic strain in the direction of $\sigma_{hmax}$ and $\sigma_{hmin}$.

In a possible embodiment, the horizontal constraints may be computed according to the ascending order of i.

In addition, determining the parameters may comprise:
receiving the porosity value $\Phi$ in subsoil corresponding to the set of data i, the proportion of clay $V_{cl}$ in subsoil corresponding to the set of data i, the proportion of calcite $V_{cal}$ in subsoil corresponding to the set of data i;

computing the aspect ratio of clay mineral (d/l) using an empirical relationship:

$$\frac{d}{l} = \lambda\left(\frac{\Phi}{\kappa V_{cl}}\right)^n$$

in order to take into account the anisotropy of elastic properties of shaley rock.

where $\phi$ is the porosity, $V_{cl}$ is clay content, $\lambda$, n and $\kappa$ are three parameters.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE DRAWINGS

As indicated above, the formula below is incorrect:

$$\sigma_h = bP + \frac{v}{1-v}(\sigma_v - bP) + \frac{E\alpha}{1-v}T$$

The correct formula is not a simple integration with respect to z and should be written:

$$\sigma_h = \int_0^\tau b(\tau)\frac{\partial P}{\partial \tau}d\tau + \int_0^\tau \frac{v(\tau)}{1-v(\tau)}\left(\frac{\partial \sigma_v}{\partial \tau} - b(\tau)\frac{\partial P}{\partial \tau}\right)d\tau + \int_0^\tau \frac{E(\tau)\alpha(\tau)}{1-v(\tau)}\frac{\partial T}{\partial \tau}d\tau$$

The integrations of the above formula are integrations with respect of progressive increases of burial depth of the investigated layer from surface or seabed to current position at depth $z_0$. In other words, the above integrations are integrations with respect to time over the whole sedimentation history of the considered layer.

Such integration is a priori impossible to be resolved since neither detail geological evolution nor the associated poromechanical properties changes of the investigated layer over past millions years is known.

Figure 1:
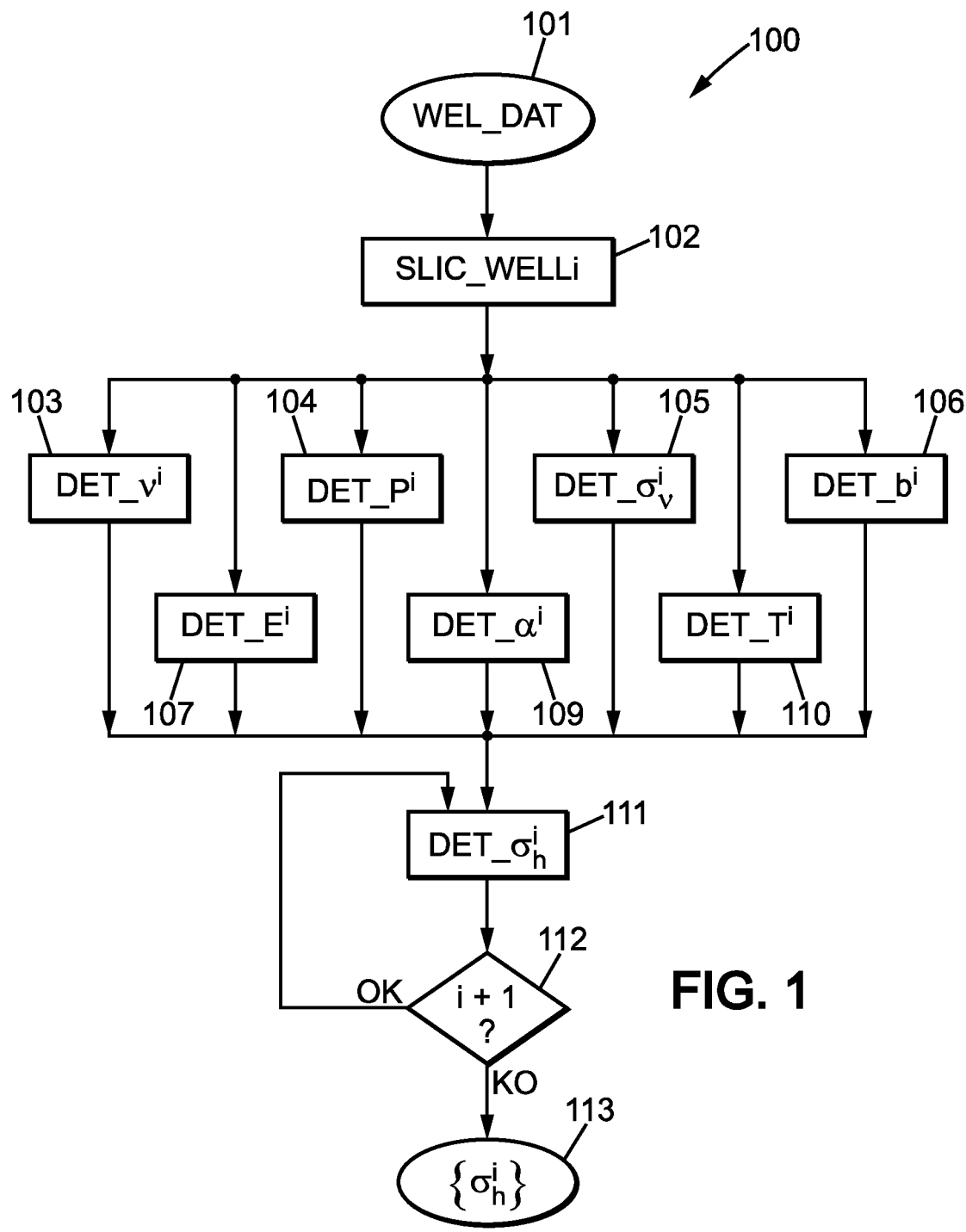
FIG. 1 is a flow chart describing a possible embodiment of the present invention.

FIG. 1 is a flow chart 100 describing a possible embodiment of the present invention.

In order to determine the above formula of $\sigma_h$, the well data 101 is sliced (step 102) into a plurality of layers having a constant or variable vertical depth increment. Each slice is identified by an ordered index i in $\{0, \ldots, n\}$.

Once the well lithology data have been sliced, it is possible to determine for each slice i:
the Poisson's ratio $v^i$ (step 103);
the mean pressure $P^i$ (step 104);
the vertical constraint $\sigma_v^i$ (step 105);
the Biot coefficient $b^i$ (step 106);
the Young's modulus $E^i$ (step 107);
the thermal expansion coefficient $\alpha^i$ (step 109);
the mean temperature $T^i$ (step 110).

These parameters may be considered as constant for each value of i.

Thus, for each slice i (starting with i=0 and incrementing the value of i by 1 at each iteration, i+1 denoting a slice immediately below the slice i), it is possible to compute (step 111):

$$\sigma_h^i = \sigma_h^{i-1} + b^i(P^i - P^{i-1}) +$$
$$\frac{v^i}{1-v^i}(\sigma_v^i - \sigma_v^{i-1} - b^i(P^i - P^{i-1})) + \frac{E^i\alpha^i}{1-v^i}(T^i - T^{i-1})$$

If the value $\sigma_h^{i-1}$ is not defined (i.e. i=0) then the value $\sigma_h^{i-1}$ is considered to be 0 (for onshore well and water pressure at sea bed for offshore well).

If there is at least one slice i not iterated (i.e. i<n, test 112, output OK), then the value of i is incremented and the step 111 is reiterated.

If all slices have been iterated (i.e. i+1>n, test 112, output KO), the computed value of the horizontal constraints $\sigma_h^i$ is outputted.

This "iterative integration" method assumes that the history of sedimentation and compaction of layer i at present-day at depth z can be represented numerically by the present-day's porosity and density evolution (vertical profiles) from seabed to depth z, even if there are lots of layers having different mineral composition compared to that of layer i.

This assumption is valid with accepted uncertainty for most offshore basins without radical changes of sedimentation environment over past millions years.

There is a fundamental difference between these two following equations:

$$\sigma_h = bP + \frac{\nu}{1-\nu}(\sigma_v - bP) + \frac{E\alpha}{1-\nu}T$$

$$\sigma_h^i = \sigma_h^{i-1} + b^i(P^i - P^{i-1}) + \frac{\nu^i}{1-\nu^i}(\sigma_v^i - \sigma_v^{i-1} - b^i(P^i - P^{i-1})) + \frac{E^i\alpha^i}{1-\nu^i}(T^i - T^{i-1})$$

In the second equation, the poro-elastic properties E, b, $\nu$ and $\alpha$ of layer i have a limited impact on present-day horizontal stress, their influences on $\sigma_h$ are proportional to the increment $\Delta\sigma_v$, and $\Delta P$, $\Delta T$ between two consecutive layers (numerical layers), while according to the first equation, the horizontal stress of layer i depends uniquely on present-day poro-elastic properties of layer i, so is independent to the stress in the layer just above it (layer i−1).

In steps 103 to 110, the elastic properties of formations may be computed with different methods according to geological context of the field:
- Hashin-Shtrikman and Morri-Tanaka micro-macro approach for normal consolidated formation,
- Modified Cam-Clay for young and unconsolidated clay and clay-sand formations,
- Tandon-Weng (1984), and Ortega A. (2010) methods for hard anisotropic shale formation (mother rock), for example gas(oil) shale.

Nevertheless, it is possible to enhance the results of said method, by taking into account, for instance, the impact of porosity on elastic properties of rocks.

The impact of porosity on the elastic parameters of porous material may be represented by the following relationship between the bulk modulus of the porous rock ($K_b$), the pore compressibility ($K\phi$) and the compressibility of mixed solid matrix $K_s$ computed from micro-macro approach:

$$\frac{1}{K_b} = \frac{1}{K_s} + \frac{\phi}{K_\phi}$$

The parameter $K_\phi$ may be dependent on the modulus of the mineral fractions and the burial depth and the pore pressure.

Based on a set of experimental data, it has been determined the following relationship:

$$K_\phi = K_s \frac{1-2\nu}{1-\nu} \alpha(\sigma_v - P)^\beta$$

Where $\alpha$ and $\beta$ are two constants dependent of geological context and type of fluid, $\sigma_v$ is the vertical stress, P is the pore pressure. Parameters $\alpha$ and $\beta$ varies in the range 0.017~0.02 and 0.45~1.0 respectively according to the geological context.

Thus, by using the determined values in the above mentioned method, it is possible to enhance the determination of the elastic properties of rocks.

In order to determine the Young's modulus in step 103, it is possible to determine an empirical relationship of aspect ratio of clay mineral as function of mineral composition for computation of the anisotropy of elastic properties of shale.

The micro-macro approach (proposed by Tandon & Weng, 1984) deals with a problem of homogenization of disc-shaped spheroidal inclusions in a homogeneous and isotropic matrix.

Application of this method to shaly formation leads to compute the elastic properties parallel and perpendicular to bedding plane of the shale.

The ratio of Young's modulus parallel to the shale's bedding plane to that perpendicular to bedding is function of the aspect ratio of spheroidal inclusion (i.e. d/l), where d is the thickness and l is the diameter of spheroidal inclusion.

Based on various experimental data obtained on shale samples having different ranges of clay content and porosity, it has been determined that d and l are related according to an empirical relationship:

$$\frac{d}{l} = \lambda\left(\frac{\Phi}{\kappa V_{cl}}\right)^n$$

Where $\phi$ is the porosity; $V_{cl}$ is clay content; $\lambda$, n and $\kappa$ are three parameters varying respectively in the range of 0.05~0.06 for $\lambda$, 2~2.5 for n and 0.15 to 0.25 for $\kappa$, according to the geological context and applicable for clay content $V_{cl}$ varying in the interval 0.05 to 0.5.

Figure 2:
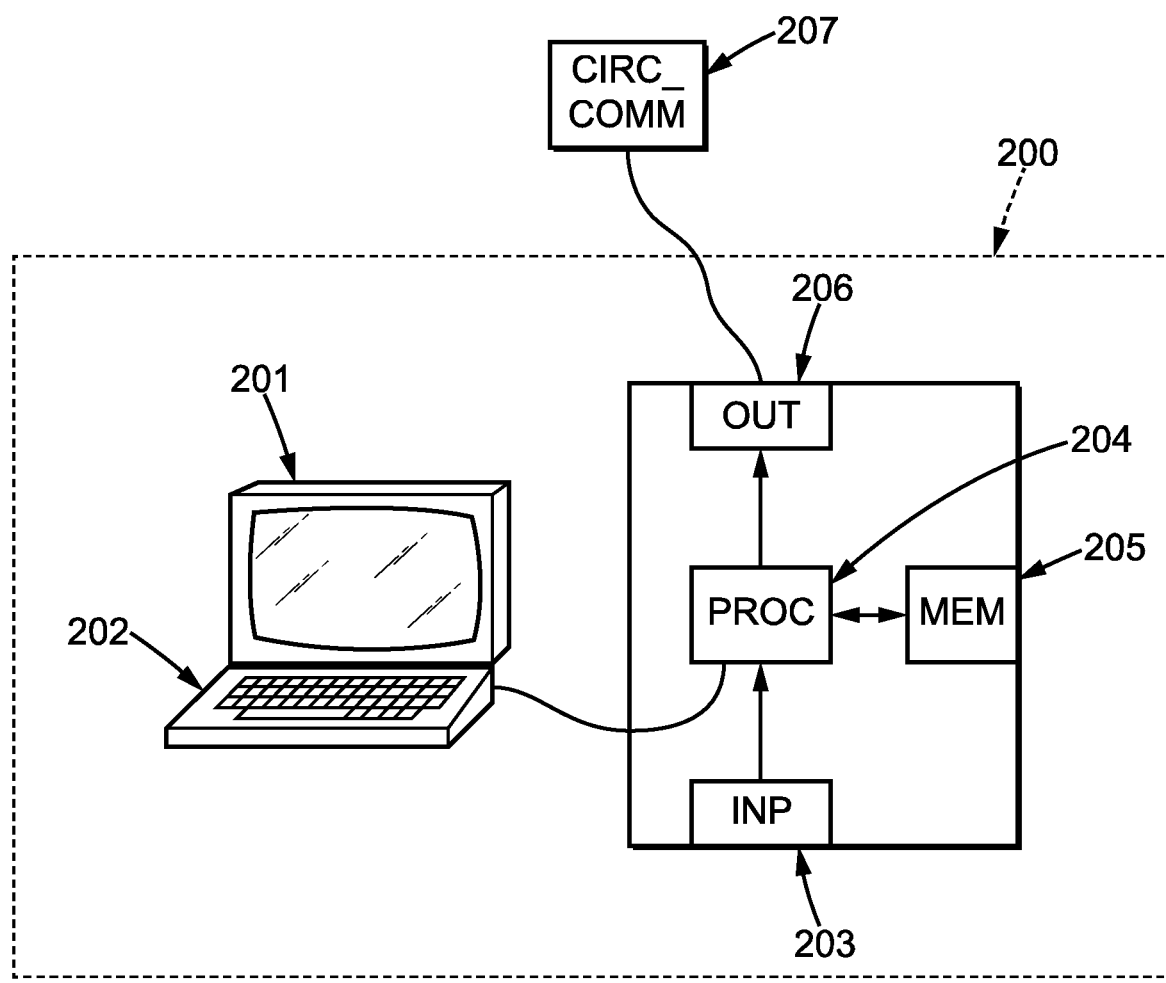
FIG. 2 is a possible embodiment for a device that enables the present invention.

FIG. 2 is a possible embodiment for a device that enables the present invention.

In this embodiment, the device 200 comprises a computer, this computer comprising a memory 205 to store program instructions loadable into a circuit and adapted to cause circuit 204 to carry out the steps of the present invention when the program instructions are run by the circuit 204.

The memory 205 may also store data and useful information for carrying the steps of the present invention as described above.

The circuit 204 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 203 for the reception of data used for the above method according to the invention and an output interface 206 for providing a stacked model.

To ease the interaction with the computer, a screen 201 and a keyboard 202 may be provided and connected to the computer circuit 204.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method of determining a plurality of horizontal constraints in a subsoil, wherein the method comprises:
   receiving well data of the subsoil;
   dividing the well data in a plurality of contiguous sets of data i respectively associated with a plurality of layers having a constant or variable vertical depth increment, a set of data i being above a set of data i+1;
   for each set of data i in the plurality of sets of data, determining, based on the set of data i, at least parameters:
   $P^i$, a pressure in subsoil corresponding to the set of data i;
   $b^i$, a Biot coefficient corresponding to the set of data i;
   $v^i$, a Poisson's ratio corresponding to the set of data i;
   $\sigma_v^i$, a vertical constraints in subsoil corresponding to the set of data i;
   $E^i$, a Young's modulus corresponding to the set of data i;
   $\alpha^i$, a rock thermal expansion coefficient corresponding to the set of data i;
   $T^i$, a temperature in subsoil corresponding to the set of data i;
   for each set of data i in the plurality of sets of data, computing and outputting the horizontal constraints based on an equation:

$$\sigma_h^i = \sigma_h^{i-1} + b^i(P^i - P^{i-1}) + \frac{v^i}{1-v^i}(\sigma_v^i - \sigma_v^{i-1} - b^i(P^i - P^{i-1})) + \frac{E^i \alpha^i}{1-v^i}(T^i - T^{i-1});$$

wherein the horizontal constraints are computed according to an ascending order of i assuming that a history of sedimentation and compaction of layer i at present-day at a depth can be represented numerically by a present-day's porosity and density evolution from seabed to the depth, even if layers have different mineral composition compared to that of layer i; and using the horizontal constraints in estimating a high of a hydrocarbon column, to assess a geomechanical hazards link to reservoir depletion, and for a design of well architecture or well integrity control for petroleum engineering.

2. The method according to claim 1, wherein determining the parameters comprises:
   receiving a porosity value $\Phi$ in subsoil corresponding to the set of data i, and a proportion of clay $V_{cl}$ in subsoil corresponding to the set of data i;
   computing aspect ratio of clay mineral $$\frac{d}{l} = \lambda \left(\frac{\Phi}{\kappa V_{cl}}\right)^n$$

where
   d and l are respectively a thickness and a diameter of spheroidal inclusion;
$\lambda$, n and $\kappa$ are three parameters varying respectively in a range of 0.05~0.06 for $\lambda$, 2~2.5 for n and 0.15 to 0.25 for $\kappa$, according to a geological context and applicable for clay content $V_{cl}$ varying in an interval 0.05 to 0.5.

3. A non-transitory computer readable storage medium, having stored thereon a computer program comprising program instructions, the computer program being loadable into a data-processing unit and adapted to cause the data-processing unit to carry out the steps of claim 1 when the computer program is run by a data-processing device.

* * * * *